United States Patent [19]

Stout

[11] 3,752,505

[45] Aug. 14, 1973

[54] SPIGOT MEMBER FOR BELL AND SPIGOT JOINT IN IRRIGATION PIPE

[75] Inventor: John C. Stout, Portland, Oreg.

[73] Assignee: Irrigation Accessories Co., Portland, Oreg.

[22] Filed: Dec. 20, 1971

[21] Appl. No.: 209,598

[52] U.S. Cl.................. 285/5, 239/267, 285/61, 285/189, 285/302
[51] Int. Cl.................. F16l 41/00, A01g 25/02
[58] Field of Search.................. 285/5, 6, 24, 27, 285/302, 190, 13, 189, 150, 61, 302; 239/267

[56] References Cited
UNITED STATES PATENTS

| | | | |
|---|---|---|---|
| 3,425,632 | 2/1969 | Stout | 285/190 X |
| 1,558,592 | 10/1925 | Chester | 285/302 X |
| 1,824,422 | 9/1931 | Badger | 285/302 |
| 1,872,088 | 8/1932 | McKee | 285/302 |
| 3,475,041 | 10/1969 | Mesko | 285/302 X |
| 2,823,807 | 2/1958 | Hempel | 285/5 X |
| 1,128,798 | 2/1915 | McLaughlin | 285/190 X |

Primary Examiner—Thomas F. Callaghan
Attorney—L. R. Geisler

[57] ABSTRACT

The spigot member of the bell and spigot assembly has an end portion of reduced external and internal diameter which extends into the bell from a water seal connection with the bell member, and is so arranged as to provide annular clearance space between the spigot and surrounding bell wall in order to prevent grit particles lodging between spigot and bell and hindering free relative longitudinal movement of spigot and bell with respect to each other, or causing excessive wear from such movement. The tip end of the reduced portion of the spigot has elements in sliding engagement with the interior wall of the bell for maintaining spigot and bell in axial alignment and for maintaining said annular clearance space.

1 Claim, 7 Drawing Figures

PATENTED AUG 14 1973 3,752,505

JOHN C. STOUT
INVENTOR.

BY F. R. Geisler,
ATTY.

SPIGOT MEMBER FOR BELL AND SPIGOT JOINT IN IRRIGATION PIPE

BACKGROUND OF THE INVENTION

Couplers of the spigot and bell type are well-known in pipelines including surface irrigation plastic pipelines. It is also well-known to have standpipes and sprinkler heads carried by the bell member of such couplers. In couplers for surface pipelines, particularly plastic pipelines, it is necessary to allow for relative longitudinal movement of the spigot and bell members with respect to each other to accommodate expansion or contraction of the connected pipe sections under changes of temperature. Generally, also, it is necessary to provide some means for locking the spigot and bell together to prevent inadvertent complete separation of the two coupling members.

U.S. Pat. No. 3,425,632, dated Feb. 4, 1969, shows such a coupling assembly in which a pipe or hollow pin, extending vertically through the bell and spigot members, serves the threefold purpose of maintaining the coupler in place, supporting a sprinkler head, and locking the spigot and bell together. In this device the spigot end within the bell is provided with a pair of diagonally opposite, elongated slots to accommodate the pipe extending through the two members and to allow some longitudinal movement of the spigot with respect to the bell member.

It has been found, however, that some grit particles in the irrigation water delivered to the pipeline become lodged in between the outside wall of the inserted spigot end and the surrounding wall of the bell, and that the accumulation of the particles would either prevent free longitudinal movement of the spigot relatively with respect to the bell or would in time result in excessive wear on these two members as the result of such relative movement. The object of the present invention is to prevent such possibility by providing annular spacing between spigot and bell so that the flow of water in such annular spacing will prevent undesirable accumulation of grit particles in between the spigot and bell.

SUMMARY OF THE INVENTION

The major portion of the spigot end extending within the bell member is reduced in diameter and the annular spacing between the two opposed surfaces of spigot and bell enables the normal flow of water to prevent any appreciable accumulation of grit particles. The water seal between the two members is located approximately at the outer end of the reduced portion of the inserted spigot. In order to maintain the spigot and bell members, and therewith their connected pipes, in desired longitudinal alignment regardless of the annular clearance between the spigot end and the surrounding bell, a plurality of elements, such as short longitudinally extending ribs, are mounted on the exterior of the reduced spigot surface at its termination. The engagement of these elements with the bell wall maintains the two members in alignment without blocking the spacing in between spigot and bell. The reduced spigot end may be provided with elongated slots and if it is desired to have a pipe supporting a sprinkler head extend down through the bell and spigot member an opposite pair of the elongated slots will accommodate such pipe.

Figure 1:
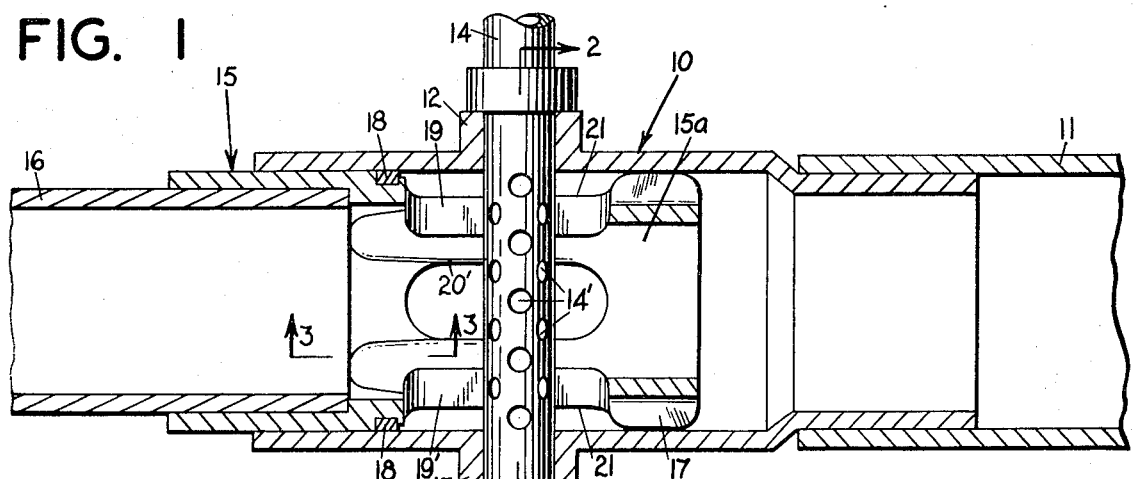
FIG. 1 is a sectional elevation taken along the longitudinal center line of the coupling showing the spigot and bell members in coupled relation, with a pipe for supporting a sprinkler head and for positioning the coupling on the ground extending vertically through the coupling.
Figure 2:
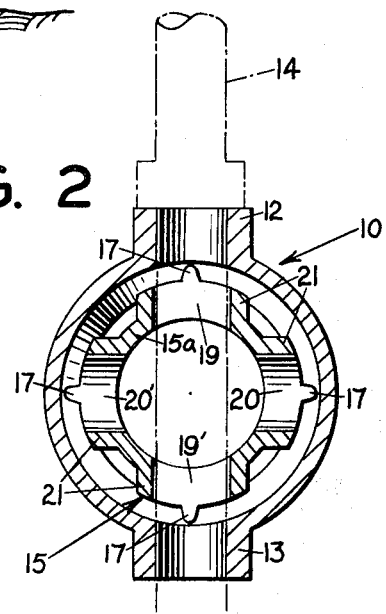
FIG. 2 is a fragmentary section on line 2—2 of FIG. 1.
Figure 3:
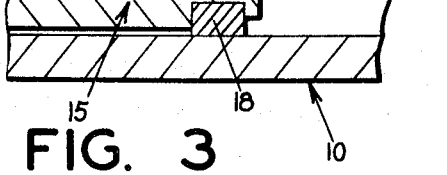
FIG. 3 is a transverse section on line 3—3 of FIG. 1, drawn to a larger scale.

Referring first to FIGS. 1, 2 and 3, the bell member of the joint assembly is indicated by the reference 10. One end of the pipe section 11 of the pipeline is secured to the bell member as usual. The bell member, in the particular arrangement shown in these figures, is formed with a pair of diametrically opposite upper and lower external sleeves 12 and 13 through which a hollow combination ground post and sprinkler head pipe extends. Suitable sealing rings (not shown) are placed in these sleeves to prevent the escape of water around the pipe 14. The portion of the pipe within the bell has openings 14' through which the water enters and passes through the upper portion of the pipe to a sprinkler head (not shown) supported at the top of the pipe. This combination of bell member and sprinkler head pipe is old in the art.

The spigot member of the joint assembly is indicated by the reference 15 and is rigidly secured on one end of the pipe section 16. The spigot is formed with an integral reduced diameter portion 15a which extends into the bell. The cylindrical inner end of this reduced diameter portion carries a plurality (for example, four as shown in FIG. 2) of approximately identical, elements, for example short ribs, 17 extending radially outwardly from the end portion 15a of the spigot for slidable engagement with the inside wall of the bell member 10.

Thus, although the outer surface of the end portion 15a of the spigot member is spaced from the interior surface of the bell member 10, the ribs 17 at the end of the spigot member serve to maintain the spigot member, and therewith its attached pipe section 16 in substantial axial alignment with the bell member 10 and its attached pipe section 11. At the same time the annular spacing between the spigot portion 15a and the surrounding bell member enables water to circulate freely around the spigot portion 15a and thereby prevent the accumulation of grit particles between the opposed surfaces of spigot and bell, and facilitates free relative longitudinal movement of the spigot member with respect to the bell member.

In order to provide the necessary water seal between spigot and bell members a sealing ring 18 is provided on the larger diameter portion of the spigot member where the larger diameter portion terminates and the reduced diameter portion 15a of the spigot member begins.

In the form of the invention shown in FIGS. 1 and 3, the reduced diameter portion 15a of the spigot member is formed with two pairs of diametrically opposite slots 19,19' and 20,20', which start at the reduced diameter portion of the spigot member, one pair of which, thus the slots 19,19' as shown in the figures, will accommodate the combination ground post and sprinkler head pipe 14. Thus, when the bell and spigot joint assembly is set up the spigot is inserted into the bell with the slots 19,19' in registration with the external sleeves 12 and 13 of the bell and the ground post pipe 14 is inserted down through the bell and spigot members to serve the multiple purpose of locking them together, securing the joint assembly in position on the ground, and allowing water to pass from the interior of the joint assembly through the openings 14' in the pipe 14 up through the upper portion of the pipe to the sprinkler head (not shown) mounted on the top end of the pipe. The fact that the slots 19,19' are elongated enables the spigot to move longitudinally to a limited extent with respect to the post and the surrounding bell member.

Preferably, although not necessarily, the reduced diameter portion 15a of the spigot is formed with a continuous external reinforcing ridge or thickened rim 21 around each slotted opening. Since the thickness of the wall of the portion 15a of the spigot is preferably the same as, or at any rate not greater than, that of the large outer or main diameter portion of the spigot, the providing of longitudinal slots in the portion 15a results in some weakening of this portion of the spigot and for this reason it is believed preferable, even if not essential, to thicken the rim around the slots. In any case, the thickened rim or ridge around each slot does not extend out far enough beyond the outer surface of the portion 15a to contact the wall of the bell member and thus does not interfere with the flow of water in the annular space between spigot and bell, which is of most importance in the present invention.

Figure 4:
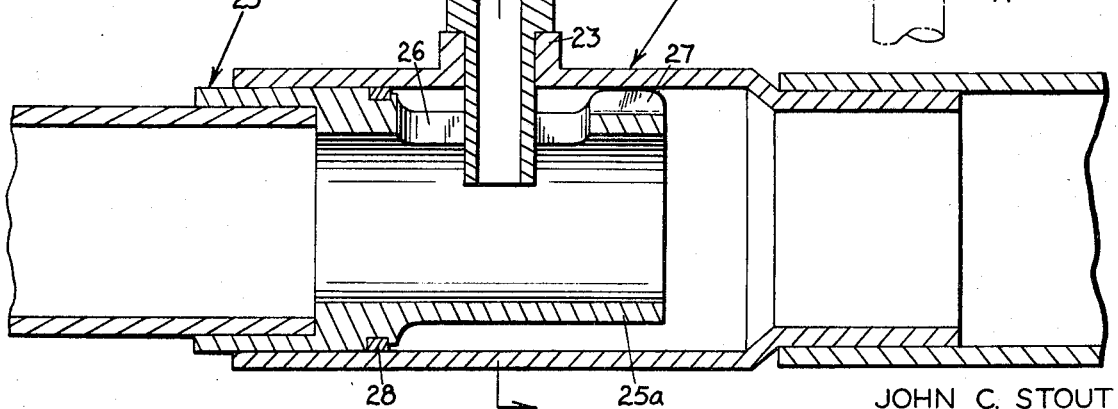
FIG. 4 is a sectional elevation similar to FIG. 1 with the pipe from the sprinkler head mounted in the bell member but not extending down through the bell member, the bottom end of the sprinkler head pipe terminating within the spigot member.
Figure 5:
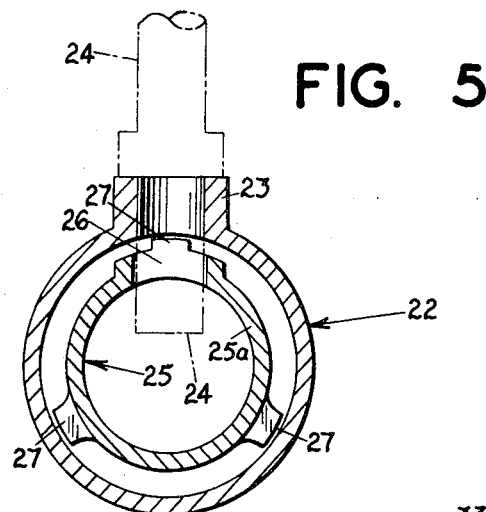
FIG. 5 is a transverse section on line 5—5 of FIG. 4.

In the form of the invention illustrated in FIGS. 4 and 5, the bell member 22 is formed with only a single sleeve 23 for the pipe 24 leading to the sprinkler (not shown), and the bottom end of this pipe terminates within the joint assembly. The spigot member 25 is similarly formed with a reduced diameter end portion 25a, but in this case the spigot end 25a is shown provided with only a single elongated slot 26 to accommodate the bottom end of the sprinkler pipe 24. The slot 26, however, similarly starts at the beginning of the reduced diameter portion of the spigot member. The reduced diameter portion 25a of the spigot member 25 carries three equally spaced short longitudinal ribs 27 at its inner end which have slidable engagement with the wall of the bell member 22 for the same reason as the ribs 17 in the coupling assembly of FIGS. 1 and 3 previously described, and the spigot member 25 also carries a customary sealing ring 28.

Since the bottom of the pipe 24 in the device illustrated in FIGS. 4 and 5 terminates within the coupling, other means will be used to hold the pipe in steady upright position. For example, a bracket or T connection (not shown) connected to the pipe can have a post extending downwardly into the ground adjacent to the outside of the bell member.

Figure 6:
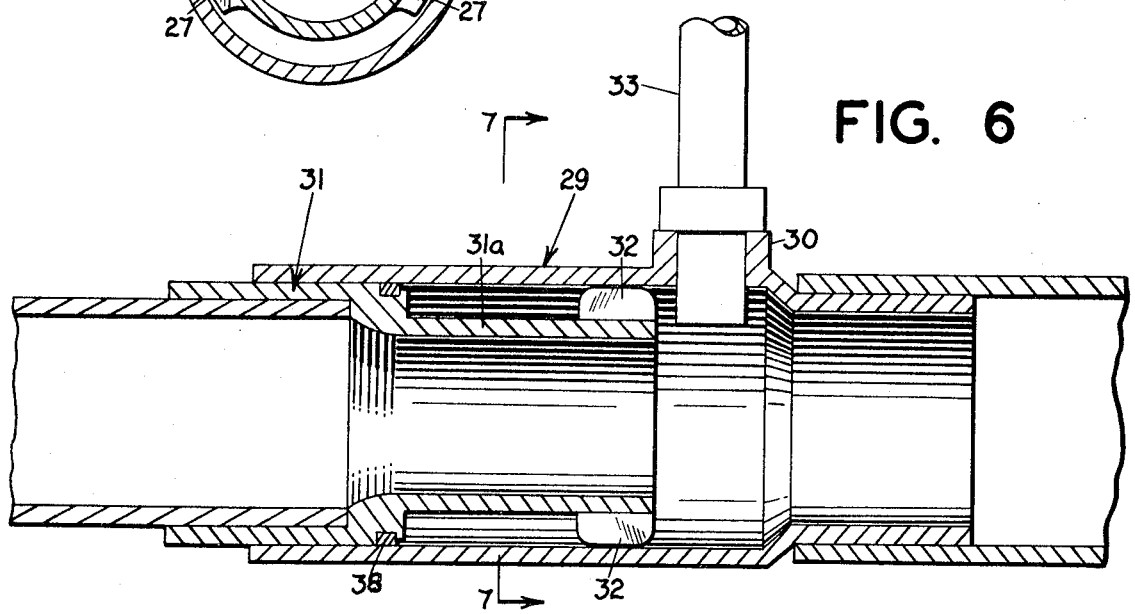
FIG. 6 is a sectional elevation, similar in part to FIGS. 1 and 4, but with the pipe to the sprinkler head connected to the bell member beyond the spigot.
Figure 7:
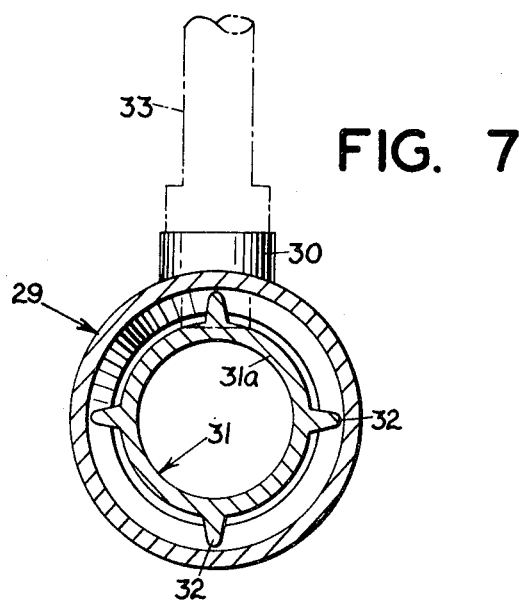
FIG. 7 is a transverse section on line 7—7 of FIG. 6.

The invention may also be employed in cases where the pipe leading up to the sprinkler head is mounted in the bell member beyond the inner end of the spigot and thus without intersecting the reduced end portion of the spigot. Such an arrangement is illustrated in FIGS. 6 and 7. In this example the sprinkler pipe 33 is mounted in the sleeve 30 of the bell member 29 beyond the end of the reduced diameter portion 31a of the spigot 31. Consequently, the spigot portion 31a need not be provided with any longitudinally extending slots. This end portion of the spigot does, however, carry the ribs 32 on its outer surface to maintain spigot and bell in axial alignment, and the spigot has the necessary seal ring 38.

Since in the form of the invention shown in FIGS. 6 and 7 the pipe 33 does not serve to lock the spigot and bell members of the coupling together, other external means for serving this function would be used. Such means is well-known in the art and need not be described and is not indicated in these figures. Also, as in the case of the coupling of FIGS. 4 and 5, external means will preferably be used to hold the sprinkler pipe 33 firmly in upright position.

Other modifications of the invention will be possible without departing from the principle of the invention of having the portion of the spigot within the bell reduced in diameter to such extent as to allow the flow of water in the annular space surrounding the spigot in the bell and with the reduced end portion of the spigot provided with elements to maintain the spigot in desired axial alignment with the bell member of the coupling and maintain the annular space between the reduced portion of the spigot and the surrounding wall of the bell.

I claim:

1. A slip coupling for irrigation conduit comprising a bell member on the end of one conduit section, a spigot member on the end of a second conduit section, an outer first portion on said spigot member having an external diameter approximately equal to the internal diameter of said bell member and adapted to be inserted part way into said bell member, sealing means between the inner end of said first portion of said spigot member and said bell member, an integral second portion of reduced external diameter on said spigot member extending from said first portion and said sealing means further into said bell member providing an annular space surrounding said second portion of said spigot member in said bell member, said second portion having an elongated longitudinally extending slot adjacent said sealing means, a radial opening in said bell member of smaller dimensions than said slot, a pipe sealingly extending through said radial opening, through said slot and into the bore of said spigot member, and a plurality of small, spaced external elements on the tip end of said second portion of said spigot member capable of sliding engagement with the interior wall of said bell member, whereby said elements by maintaining said spigot and said bell members approximately in axial alignment will maintain said annular space around said second portion of said spigot member and thereby enable the passage of liquid through said coupling to prevent accumulation of foreign matter between the surfaces of said bell and said spigot members and to allow relative longitudinal movement between said bell and spigot members.

* * * * *